W. H. ANDREWS.
Reversible Knob-Latches.

No. 137,166.

Patented March 25, 1873.

Witnesses.

William H. Andrews
Inventor,
By Atty.'

UNITED STATES PATENT OFFICE.

WILLIAM H. ANDREWS, OF NEW HAVEN, CONNECTICUT, ASSIGNOR TO MALLORY, WHEELER & COMPANY, OF SAME PLACE.

IMPROVEMENT IN REVERSIBLE KNOB-LATCHES.

Specification forming part of Letters Patent No. 137,166, dated March 25, 1873.

*To all whom it may concern:*

Be it known that I, WILLIAM H. ANDREWS, of New Haven, in the county of New Haven and State of Connecticut, have invented a new and useful Improvement in Reversible Latches; and I do hereby declare the following, when taken in connection with the accompanying drawing and the letters of reference marked thereon, to be a full, clear, and exact description of the same, and which said drawing constitutes part of this specification, and represents, in—

Figure 1:
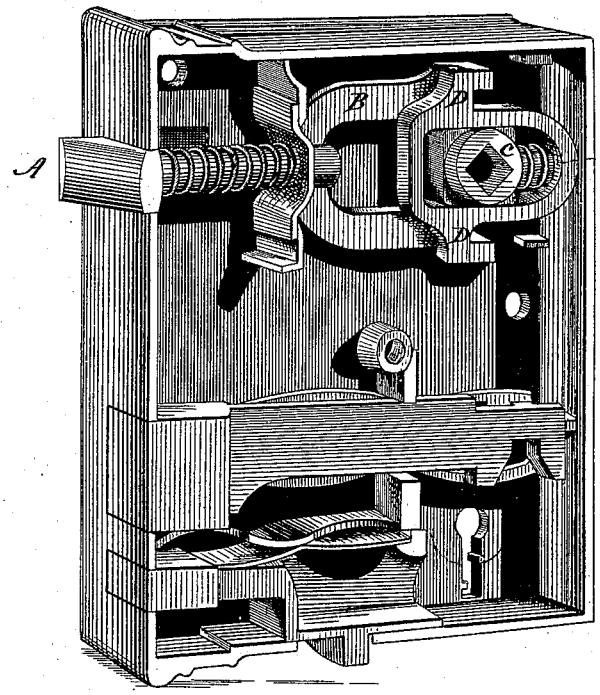
Figure 5:
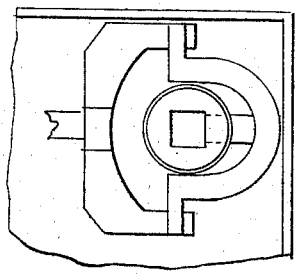
Figure 2:
Figure 3:
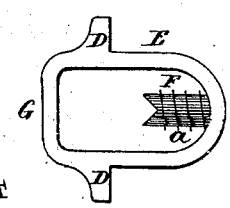
Figure 4:
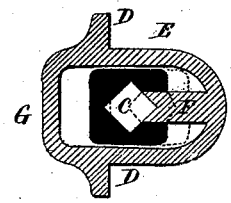

Figure 1, a perspective view; Figs. 2, 3, and 4, detached views to illustrate my improvement; and in Fig. 5, a diagram of that portion of the latch upon which my improvement is made as originally constructed.

This invention relates to an improvement in the reversible latch for which Letters Patent were granted to William E. Sparks, dated October 19, 1869.

In that patent the hub was made cylindrical, the arms in a separate piece connected together around the hub in the form of a yoke, and connected to the hub by a stud on the yoke entering the hub upon the back side, so that when the spindle was in the hub and turned this yoke and the arms would turn with it to operate in substantially the usual manner of knob-latches. When the spindle was removed the latch-bolt was withdrawn forward from the case, the stud on the yoke passing into the spindle-seat to allow this forward movement. In this construction a serious difficulty was experienced, viz., that the entire strain in operating the latch came upon the stud of the yoke, causing a rapid wear upon this stud and the perforation in the hub. To overcome this difficulty is the object of my improvement; and it consists, first, in forming the hub square, or of angular shape, and the arms of the yoke corresponding to the opposite sides of the hub, so that the turning of the hub acts directly upon the sides of the yoke instead of upon the stud; second, in joining the arms of the yoke forward of the hub, whereby the tendency to spread the arms by the turning of the hub is avoided.

The latch-bolt A is arranged within the case, and attached to the slide B in substantially the usual manner for knob-latches. C is the knob arranged with a trunnion upon each end to take its bearing in both plates of the case, perforated for the knob-spindle in the usual manner. Between the two plates the hub is made with parallel sides, as seen in Fig. 2. D D are the two arms by which the slide B is moved to draw in the latch-bolt. These arms are attached to a yoke or stirrup, E, which extends around the back side of the hub, as seen in Fig. 4, the sides of the yoke E fitting the opposite parallel sides of the hub. In the rear the hub is perforated, as seen in Fig. 4, and a stud, F, on the yoke enters the said perforation, as also seen in Fig. 4, and as in the Sparks patent before referred to, so that, when the knob-spindle is out, the latch-bolt, slide B, and arms D may be drawn forward until the nose of the latch-bolt is outside the case, in which position it may be reversed. In thus drawing forward the latch-bolt, the stud F passes into the spindle-seat in the hub, as denoted by the broken lines in Fig. 4, the bolt is pressed back into the case, and the spindle, when inserted, prevents the stud F from entering the spindle-seat, and consequently prevents the withdrawal of the latch-bolt.

By constructing the hub with parallel sides and the yoke to fit the same, the force of turning the hub is applied directly to the sides of the yoke, and not upon the stud, as in the Sparks patent, causing much less wear upon the parts, and making the hub and arms much firmer and more positive in their action. As the strain of the hub to actuate the arms would naturally tend to spread the arms, I connect the arms forward of the hub by a bar, G, which positively prevents any such liability to spread.

In order to prevent the parts from lying loosely in the case when the spindle is not present, I arrange a spring, *a*, around the stud F, as seen in Figs. 1 and 3, which bears against the hub with sufficient force to hold the arms back, and consequently the nose of the latch-bolt within the case, as seen in Fig. 1.

I claim as my invention—

1. In a knob-latch in which the arms D are formed upon a yoke around the hub, and with a stud, F, to enter a recess in the rear of the hub, constructing the hub with its opposite sides parallel and the yoke of the arms corresponding thereto, so that by means of the said parallel sides the hub causes the movement of the arms, substantially as described.

2. In combination with the subject-matter of the first clause of claim, the bar G, connecting the arms D D forward of the hub, substantially as described.

3. In combination with the subject-matter of the first clause of claim, the spring $a$ upon the stud F, substantially as and for the purpose described.

WILLIAM H. ANDREWS.

Witnesses:
    J. H. SHUMWAY,
    A. J. TIBBITS.